United States Patent [19]

Morgan

[11] Patent Number: 5,040,557
[45] Date of Patent: Aug. 20, 1991

[54] VEHICLE COVER SYSTEM

[76] Inventor: Larry Morgan, 3835 Country Club Dr., Long Beach, Calif. 90807

[21] Appl. No.: 489,321

[22] Filed: Mar. 5, 1990

[51] Int. Cl.⁵ .......................................... E04H 15/06
[52] U.S. Cl. ...................................... 135/88; 296/136
[58] Field of Search .................. 135/88, 90; 296/95.1, 296/136; 150/166, 168

[56] References Cited

U.S. PATENT DOCUMENTS

| | | |
|---|---|---|
| 2,874,709 | 2/1959 | Cohen et al. ...................... 135/88 X |
| 3,956,301 | 5/1976 | Huber . |
| 3,992,053 | 11/1976 | Hrytzak et al. . |
| 4,432,581 | 3/1984 | Guma . |
| 4,605,030 | 8/1986 | Johnson . |
| 4,684,165 | 8/1987 | Becker . |
| 4,718,711 | 1/1988 | Rabbit . |
| 4,720,135 | 1/1988 | Farma . |
| 4,732,421 | 3/1988 | Ross et al. . |
| 4,805,654 | 2/1989 | Wang . |
| 4,825,889 | 5/1989 | Monteith . |
| 4,858,985 | 8/1989 | Wojcik . |
| 4,925,234 | 5/1990 | Park et al. ...................... 135/88 X |

FOREIGN PATENT DOCUMENTS

| | | | |
|---|---|---|---|
| 290384 | 3/1966 | Australia ................................ | 135/88 |
| 190815 | 7/1957 | Austria .................................. | 135/88 |
| 560866 | 5/1960 | Belgium ................................ | 135/88 |
| 2504948 | 8/1976 | Fed. Rep. of Germany ...... | 296/136 |
| 1395225 | 3/1965 | France .................................. | 135/88 |
| 646059 | 9/1962 | Italy ...................................... | 135/88 |
| 0036175 | 3/1980 | Japan .................................... | 296/136 |
| 388604 | 7/1965 | Switzerland .......................... | 135/88 |
| 2120188 | 11/1983 | United Kingdom ................ | 296/136 |

*Primary Examiner*—Richard E. Chilcot, Jr.
*Assistant Examiner*—Lan Mai
*Attorney, Agent, or Firm*—L. Lee Humphries

[57] ABSTRACT

A vehicle cover system has front and rear frames disposed to be suspended at a single support point at the front and a single support point at the rear of a vehicle, midway between the sides of the vehicle, preferably at the front and rear license plate mounting means. A cover having a transverse peak attaches to the front and rear frames and extends over the vehicle and down the sides. A carrier is disposed intermediate the ends of the vehicle, rests on the vehicle and extends downwardly at the sides of the vehicle and lifts the cover away from the top and the sides of the vehicle. The cover is held clear of the front and rear of the vehicle by the frames, allowing air to circulate between the vehicle and the cover. The front and rear frames and the carrier telescope in order to be stored and the front and rear frames may be locked in place.

2 Claims, 3 Drawing Sheets

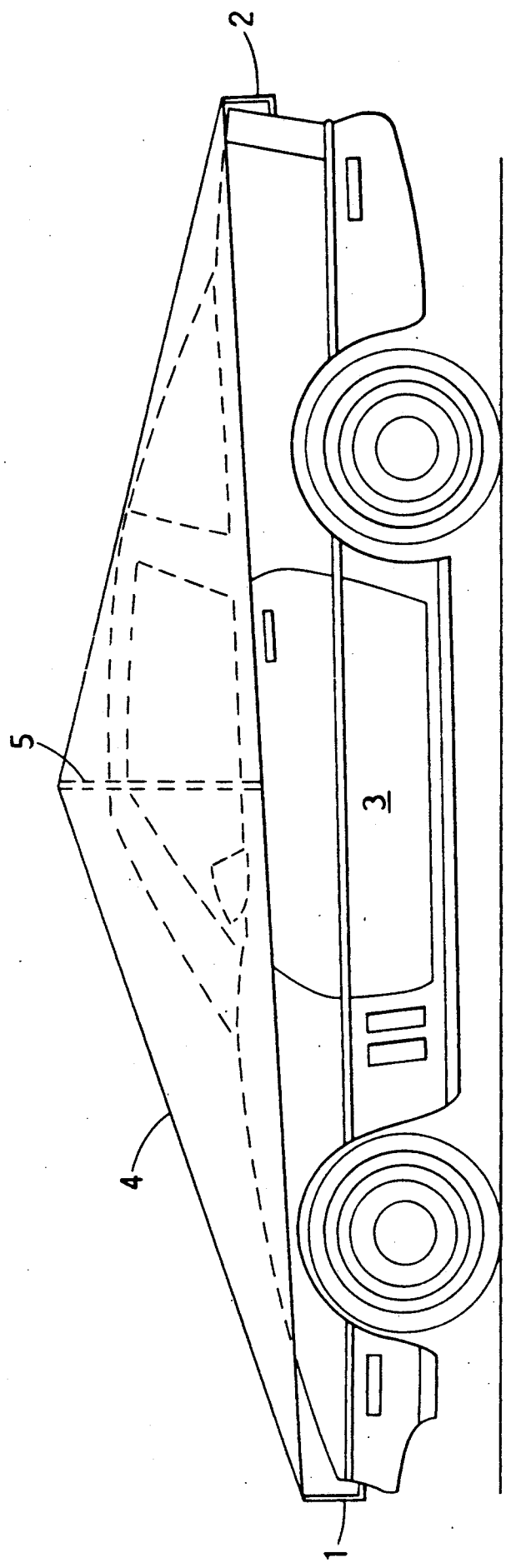
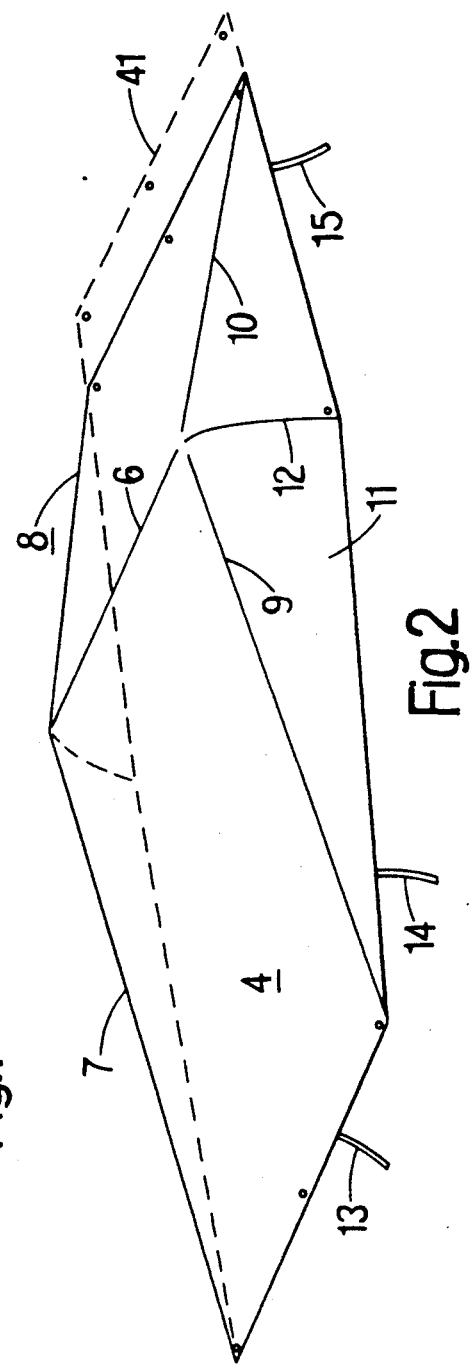
Fig.1
Fig.2

VEHICLE COVER SYSTEM

This invention relates to a stylish, but highly functional, vehicle cover system for vehicles of all kinds, particularly those requiring registration with governmental agencies and consequently having license plate mounting means at the front and rear of the vehicle. The frame of the vehicle cover system is anchored at the front and rear of the vehicle, midway between the sides. The license plate mounting means provides such a convenient midway location. The invention serves as a cover not only for protection against the sun, but, also, provides protection against rain, hail, sleet and snow. It is primarily designed, however, for protection against the sun and for keeping the inside of a parked vehicle cooler than if exposed to the sun.

BACKGROUND OF THE INVENTION

There are numerous vehicle covers and sunshades in the prior art. Covers, such as shown in U.S. Pat. Nos. 3,992,053, 4,684,165 and 4,825,889 attach to the front and rear of an automobile and provide means for spacing the cover from the car. Carriers with folding legs, for spacing the cover from the car, are shown in U.S. Pat. No. 3,992,053. Telescoping, carrier ribs for automobile sun shields are shown in U.S. Pat. No. 4,805,654. U.S. Pat. Nos. 3,992,053 and 4,684,165 teach the use of side panels. U.S. Pat. No. 4,732,421 also shows a cover which covers the sides of the car.

Two of the most difficult problems are determining how to attach the cover or sunshade to the vehicle and how to dispose the cover with respect to the car. U.S. Pat. No. 4,805,654, mentioned above mounts what is essentially an umbrella over a car. Many systems simply drop the cover on the vehicle or use spacers to hold the cover spaced upwardly from the roof of the vehicle.

SUMMARY OF THE INVENTION

This invention is a vehicle cover system comprising front and rear frames which are attached at the front and the back of the vehicle, midway between the sides thereof. The license plate mounting means of the vehicle provides a convenient location for such attachment. The license plate mounting means may on a particular vehicle, for example, be merely one or two screw holes, a bracket, a license plate holder, a license plate frame or a bracket for holding the license plate frame or its holder. A license must be displayed on all vehicles which, by law, must be registered. So, manufacturers include on every registrable vehicle, license plate mounting means. Sometimes, it is as simple as two screw holes in the chassis or bumper, and at other times, it includes a bracket for holding a license plate or a license plate frame. At other times, it includes the license plate frame itself. Usually, the registrable vehicle has a license plate frame or holder located at the front and rear of the vehicle, midway between the sides of the vehicle.

Such license plate holding means, front and rear, provide convenient points of attachment and suspension for the vehicle cover system of the invention. Each frame, front and rear is attached to the vehicle at such location.

Each frame, front and rear, of the system of this invention, is adapted to have one end of the cover attached to it. (As used herein, "vehicle cover system" includes the frames and fabric, plastic or other composition cover. The word "cover", when used by itself, refers to the fabric, plastic or other composition cover of the "vehicle cover system".)

The cover is of a shape fitted generally to the vehicle, covering it and extending down the sides. In the case of a car, the cover extends down the sides to wholly, or at least partially, cover the windows. The cover is held spaced from the vehicle, or car, by an intermediate carrier. These latter two features, intermediate carrier and cover extending down the sides, serve to keep the vehicle cooler than most of the covers on the market today.

In one embodiment, cover support lines, which may be slightly taut, extend from each end of the rear frame to each corresponding end of the front frame. The two lines (one on each upper side of the vehicle) pass upwardly, over the car, passing through a loop or hook, on the intermediate carrier.

The front and rear frames telescope to be more compact for storage. The intermediate carrier also telescopes for storage. The vehicle cover system of the invention is conveniently set up and removed from the vehicle. There is no need to reach under the vehicle or into fender or bumper recesses to set up or take down the vehicle cover system. The system is readily removed from the vehicle and stowed in the trunk or other space, including, the inside of the vehicle, within the floor space, luggage well or other subfloor space.

Various tie-downs, such as bungee cords, may be added for stability against high winds. Velcro straps or lines may also be used to attach or to tie down or to stabilize the frames, intermediate carrier or cover to the bumpers, fenders, or other portion of the vehicle body.

The front and rear frames positively engage the car, but may also include devices which lock them to the car, to discourage theft. The cover may also have extensions, tabs or pennants which may be disposed to extend into the trunk, when the trunk lid is closed and which may be disposed to extend under the hood, when it is closed. Although the locked frames, pennants and extensions may all be cut, in one manner or another, their existence renders theft much less attractive and any theft would require more than mere removal.

The cover may be made of various materials which are readily available such as woven cloth or fabric, canvas, cotton duck, plastic, (such as a polyethylene, a polypropylene or a nylon taffeta, possibly coated with polyurethane to waterproof it), Gore-Tex (a well-known waterproof, plastic mesh), a thin metal or metallized sheet, Mylar, or a combination of any of them or others. Still other suitable materials are vinyl-coated nylon and various reflective sun shield materials which are readily available.

The cover may or may not be waterproof, depending on the design. For example, a nylon taffeta, coated on its under side with a polyurethane, would provide a waterproof cover material. Inasmuch as there is substantial spacing between the cover and the vehicle, any "sweating" of the underside of the plastic cover would readily evaporate and the cover would stay dry.

Various other materials, with proper seam sealing would also provide a water repellent cover. Ordinarily, a cover which is water-repellent (as distinguished from waterproof) would be more affordable and work reasonably well in protecting against rain. Using water repellents, such as Scotchgard or Thompson's Water Seal, on fabric or woven plastic, would provide some measure of water-repellency. Such water-repelling products and similar products are readily available in retail stores.

It is, therefore, an object of this invention to provide a vehicle cover system which is conveniently attached to and removed from a vehicle.

It is also an object of this invention to provide a carrier for the cover of a vehicle cover apparatus, which carrier holds the cover above the vehicle and away from the sides of the vehicle.

It is an object also of this invention to provide a vehicle cover system in which the cover terminates at the front and rear of the vehicle and is held in close, spaced relationship to the vehicle and above and clear of the front and rear of the vehicle.

Another object of this invention is to provide a vehicle cover system which is readily attached to the front and rear license plate mounting means of a vehicle.

Still another object of this invention is to provide a vehicle cover which is held spaced apart from a substantial area of the top of a vehicle.

A further object of this invention is to provide a vehicle cover which is held spaced apart from the sides of a vehicle.

Another object of this invention is to provide a lockable vehicle cover system.

A still further object of this invention is to provide a vehicle cover system which is supported from a single support point at the front and another at the rear of the vehicle.

Still another object of this invention is to provide a cover adapted to receive a carrier which holds the cover in place and away from a vehicle.

Other objects and features will become apparent from the drawings, discussion and claims which follow.

FIG. 1 is an illustration of the vehicle cover system on a car.

FIG. 2 is the cover portion of the vehicle cover system, showing the peak running transversely of the cover.

DESCRIPTION OF THE INVENTION

Figure 3:
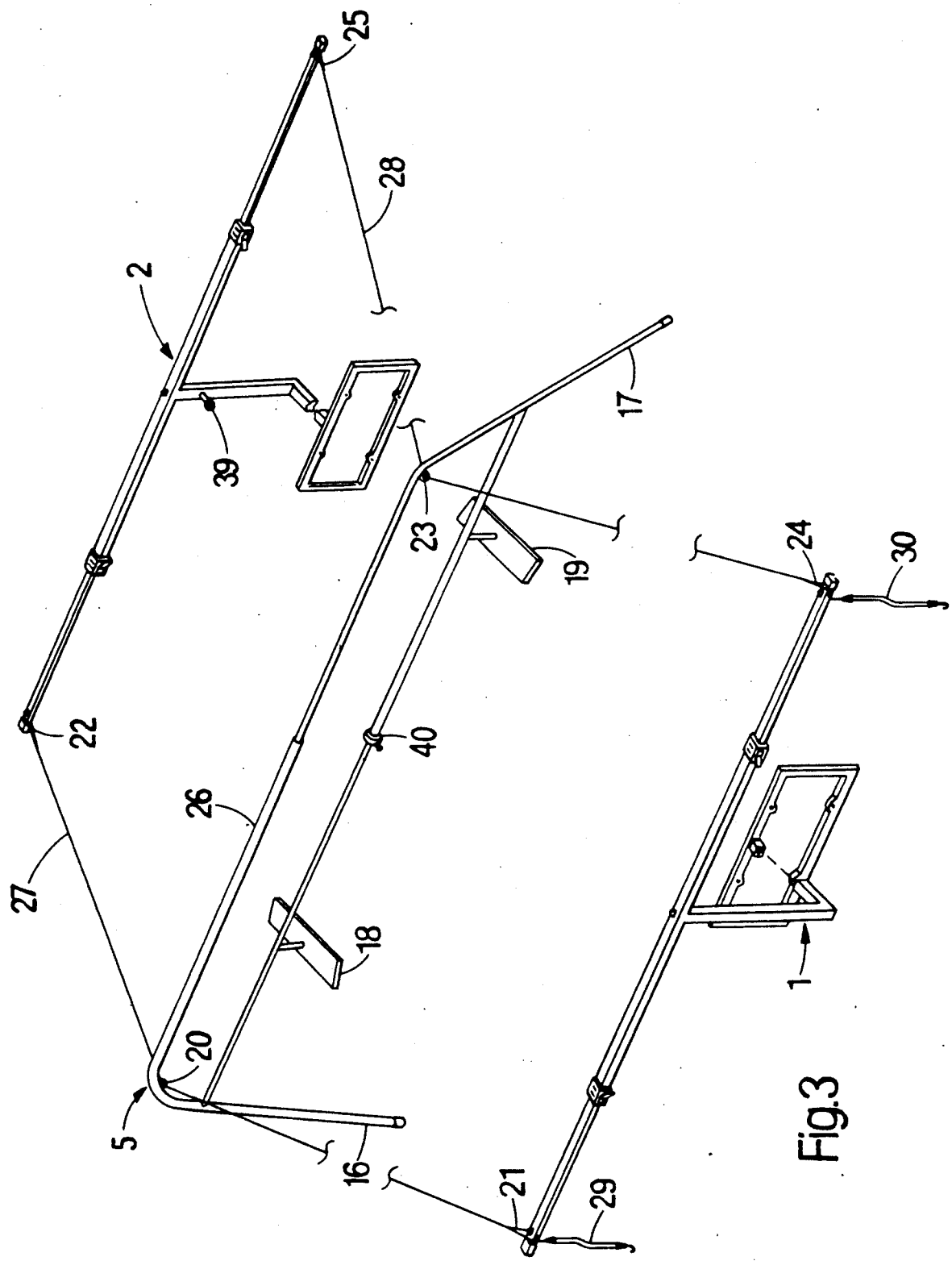
FIG. 3 shows the rear frame, the intermediate carrier and the front frame of the vehicle cover system and the means for attaching to the license plate holding means.

In FIG. 1 is shown the vehicle cover system disposed on an automobile. It may, of course, be used in connection with most any vehicle. The dimensions would be adjusted to the particular vehicle involved. The vehicle cover system is comprised of front frame 1 and rear frame 2 which are attached to the front and the rear of vehicle 3, and in the preferred embodiment are attached to the license plate mounting means, as discussed hereinafter in connection with FIGS. 3 and 4. Frames 1 and 2 telescope inwardly. They include locking devices which hold the elements in place when extended. Such frames may be readily manufactured from camera tripod legs or the like. Such telescoping, lockable legs are readily available through camera stores.

The system also includes a cover 4, which may be seen to extend partially down the sides of the vehicle 3, so as to cover at least a substantial portion of the sides of the vehicle. In the case of an automobile, it preferably extends far enough down the sides to cover the windows. This approximates the upper half of the sides of an automobile.

Cover 4, which is further illustrated in FIG. 2, may be seen to have a shape which slopes forwardly, from a central transverse peak, to the front frame and slopes rearwardly, to the rear frame. The cover 4 is attached to the frames by snap fasteners, turn or twist-type fasteners, hooks, ties or other means.

It is noted, in this preferred embodiment, that the cover terminates, at the frames and does not extend downwardly over the frames. This is significant in allowing the free flow of cooling air, from the rear and from the front of the vehicle, between the cover and the vehicle. It also contributes to the stylishness of the vehicle cover system.

In some instances, in order to fit a cover to more than one make or model of automobile, the cover may have an extension added thereto, as shown at 41 in FIG. 2. The end of the extension 41 is fastened to the frame using the snap, turn or other fastener means mentioned above. For a shorter automobile, the extension 41 would hang downwardly over frame 2. Such extension may, of course be either at the front or the rear of the automobile. When extension 41 extends over the frame, tie-downs or Velcro may be used to prevent the loose end of the cover from flapping in the wind.

It may be seen from FIGS. 1 and 2 that the cover 4 is held in close relationship to the vehicle, but spaced from substantially the entire upper surfaces of the vehicle. Frames 1 and 2 accomplish this over the front and rear portions of the vehicle and intermediate carrier 5 (shown in FIG. 1 by hidden lines) accomplishes this as to the top of the vehicle. Carrier 5 also holds the cover spaced from at least a substantial portion of the sides of the vehicle. In some embodiments, such as for a four-door automobile, in order for the cover to clear the windshield and the rear window, two intermediate carriers may be desirable, rather than having one high carrier. In such event, the carriers may be of differing heights above the vehicle or be the same height. Preferably, they would be of differing heights, so that the cover would slope continuously to the front and to the rear of the vehicle and there would not be a flat surface on top of the vehicle. Rainwater would thus readily drain and not accumulate on top of the vehicle.

Also, a low-profile sports car would not require an intermediate carrier that would be as tall above the roof as the intermediate carrier for a coupe, in order to provide desired clearance between the vehicle and the cover.

In a preferred embodiment two lines, or cords, complete the framework for holding the cover. Each line is disposed to attach, at one of its ends, to near the end of the rear frame, and, at the other of its ends, to near the end of the front frame. It attaches to, passes over or is suspended from the intermediate carrier 5. The lines are shown in FIG. 3 and 27 and 28. Disposing one on each side of the vehicle provides a framework over which the cover 4 fits and is thereby held in shape. The two lines 27 and 28 fit inside the cover 4 and fit along inside the seams or ridges shown at 7 and 8 (on one side of the car) and 9 and 10 (on the other side of the car) shown in FIG. 2. Alternatively, such lines could be sewn or otherwise attached to the cover, preferably inside thereof, running along such seams or ridges.

In similar fashion, intermediate carrier 5 is adapted to be disposed along and fit into the underside of transverse peak 6, of cover 4.

The cover 4 extends down the sides of the vehicle as may be seen in FIGS. 1 and 2 wherein side panel 11 extends down the side. There is a similar side panel, of course, on the far side of the cover. A zipper, Velcro fastening strip, or other opening means may be disposed at 12 in order to provide access to the door or the window or to allow easier removal of a highly-fitted cover. Further, pennants or tabs, such as shown at 13, 14 and 15 may be attached to the cover and, upon covering the vehicle, the pennants would be extended under the hood or the trunk lid and be trapped when the hood and trunk are closed. Similar pennants could be provided to extend into door and window openings. Such would help to prevent easy theft.

FIG. 3 shows the front and rear frames, 1 and 2, and the intermediate carrier 5 having a beam 26 adapted to be disposed transversely on the top of the vehicle and lift the cover clear of the top. It also shows the manner of connection of the frames to the license plate mounting means. The license plate means are at the front and rear of the vehicle and are shown as being approximately midway between the sides of the vehicle. It is to be appreciated that one or both of the license plate mounting means may be located other than midway between the sides of a vehicle. In such event, the system, by appropriate extensions, may still be connected to and suspended or supported, from the license plate mounting means. Or, alternatively, it may be connected to a suspension point, or support point, that is midway between the sides of the vehicle. This may necessitate drilling or welding to the vehicle body at such mid-location, in order to provide the attachment described hereinafter.

Adjustable support member 39 is provided in some embodiments to stabilize and strengthen the frames 1 or 2, or both. Such adjustable support member 39 strengthens against the pull by the cover from the other end of the car. Also, it serves to support the frame member 1 or 2 against rotation. It can be as simple as a lead screw (and a nut to hold it in place) with a cushion tip, as shown, or it may comprise more complex structure which snaps or unfolds into place.

It may be seen that the front and rear frames and the carrier 5 are built to telescope. In this way, they can be readily stowed. Also, they may be adjusted to fit the dimensions of the cover placed over them. This is particularly true of the carrier 5 which, it is noted, has two downward extensions, 16 and 17, which are legs, on beam 26, extending downwardly, for holding the cover away from the sides of the vehicle. The distance between such downward extensions 16 and 17 may be adjusted and then held by means of clamp 40. Two feet, 18 and 19 on the carrier, are adapted to rest on the vehicle and provide support and stabilization means for said beam. The bottoms of the feet 18 and 19, the surfaces which contact the vehicle, may be either canted or pointed in desired directions, or both, so as to stand flat on the vehicle top. Thus, the carrier holds the cover clear of the top and the sides of the vehicle. Loop 20, may be a snaplock, (which opens to permit the line 27 to be entered), a hook or other line-holding device, which provides a means to suspend the line 27, running from loop 21 on front frame 1 to loop 22 on rear frame 2.

A similar line 28 may be suspended in loop 23, running to loops 24 and 25. Thus, a framework is established to maintain the cover in shape. As mentioned previously, such lines 27 and 28 may be sewn to the cover. The ends of such lines would simply be tied to the front and rear frames, to hold the cover securely. At the same time, additional hooks, ties, or fasteners could be used to attach the cover to the frames.

Bungee cords, pennants, lines, (or other tie-down means), may be utilized to further stabilize the frames by attaching the cords, shown, for example, at 29 and 30 to the bumper, fender, or other convenient part of the vehicle body. Other, similar tie-downs, or stabilizing cords, may also run from grommet holes in the cover to any selected portions of the vehicle body, including the bumpers, decorative strips, fenders, door handles, underbody portions, etc.

The intermediate carrier 25 may also have a bungee cord, tape or pennant (or other tie-down means) which attaches from the carrier to any such selected portions of the vehicle body.

It is noted that the cover has a transverse peak 6 (FIG. 2). Beam 26 of the carrier 5 fits into the underside of transverse peak 6. A great deal of stability and anchoring is achieved by such structure. The design also functions to hold the cover clear of at least substantially the entire top of the vehicle. Inasmuch as the carrier has a downward extension on each end and, further, inasmuch as it is adjustable as to the distance between its downward extensions, it extends the cover outwardly and, also, by extending downwardly, it holds the cover clear of at least a substantial portion of the sides of the vehicle.

As can be seen from FIGS. 1, 2 and 3, the vehicle cover system is adapted to hold the cover in close proximity to, but clear of substantially the entire top of the vehicle. It is particularly noted that the front and rear frames hold the ends of the cover closely spaced, that is, a few inches or less, above the front and the rear of said vehicle, providing free air passage into the front and into the rear between said cover and said vehicle. This is accomplished by the cover terminating at or near the frame, to which it is attached. There is thus allowed a free flow of air, into the front and into the rear, between the cover and the car.

In a preferred embodiment, the construction of the frames 1 and 2 and the cover 4 are such that, when disposed on a vehicle, the cover is entirely spaced apart and clear of the vehicle and there is a free flow of air between the vehicle and the cover. The side portions, in such embodiment, are held clear of the sides of the vehicle by the intermediate carrier 5. In this manner, because of the permitted circulation of air, the vehicle is kept cooler and there is considerably less heat buildup inside the car.

Figure 4:
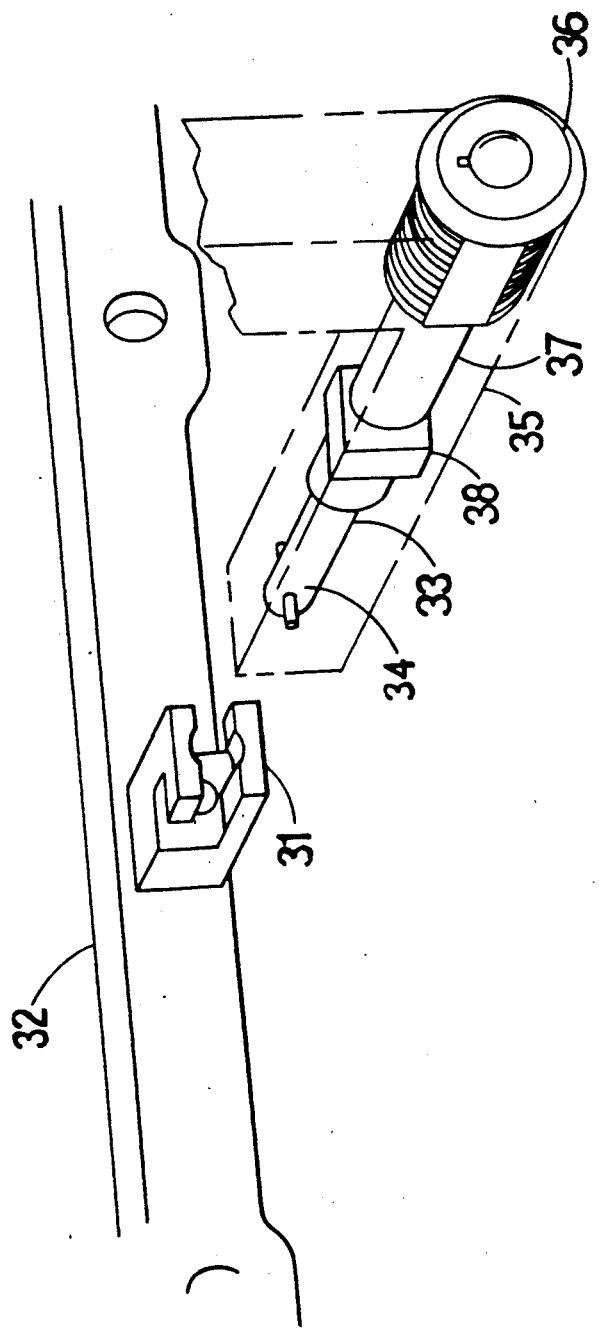
FIG. 4 illustrates in greater detail the means for attaching to the license plate holding means, including locking means.

FIG. 4 shows in greater detail the attachment of the frame, front or rear, to the license plate mounting means. In the preferred embodiment shown, there is shown a single support point for the front and rear frames. In this particular embodiment, a slotted nut 31 is welded, bolted, riveted, or otherwise attached to the license plate holder 32 at a single support point. The slotted nut 31 is devised to receive the end of shank 33. In the embodiment shown, the nut 31 has a slot arrangement, which receives transverse pin 34 on shank 33. To lock the frame of the vehicle cover system to the license plate frame, the shank 33 is rotated, within frame member 35 (which forms a part of frame member 1 or 2) and shank 33 and pin 34 cannot be removed without reversing their rotation.

The shank 33 and pin 34 may be locked so that they cannot be rotated and removed. Lock cylinder 36 provides locking structure. The lock cylinder 36, which is flat on its sides, carries a rotatable sleeve 37, which rotates with shank 33. A journal block 38 stabilizes sleeve 37 centrally within frame member 35. Lock cylinder 36 fits within frame member 35 and the cylinder body cannot be rotated therein. A collar on the end of lock cylinder 36 prevents it from being pushed on through frame member 35. When the cylinder 36 is rotated and thus locked, the shank 33 and pin 34 are locked in place in the slotted nut 31 and cannot be removed. Thus, frame member 35 is held to the vehicle and cannot be removed until the lock cylinder is unlocked and sleeve 37, shank 33 are rotated so that pin 34 is freed from the slotted nut 31. Of course, they cannot be rotated unless a key unlocks the lock cylinder. Such locking cylinder 36, sleeve 37, shank 33, its pin 34 and slotted nut 31 are well-known in the art and are commercially available. Alternative locking devices may be used. It is preferable that the part attached to the vehicle be small in order not to require substantial change to the license plate mounting means.

It is noted that frame member 35 (and the longitudinal frames 1 or 2, which it supports) is irrotatable when attached to the vehicle. This is accomplished by the square or rectangular structure of the slotted nut 31 and of the frame member 35. Structures other than square or rectangular structures could be used. An irrotatable cylindrical means could be provided to attach the frames 1 and 2 to the vehicle In other embodiments, two, spaced points of support could be used to prevent rotation of the frame member 35. However, the square structure shown, with such single point of support, is the preferred embodiment.

Although specific embodiments and certain structural arrangements have been illustrated and described herein, it will be clear to those skilled in the art that various other modifications and embodiments may be made incorporating the spirit and scope of the underlying inventive concepts and that the same are not limited to the particular forms herein shown and described except insofar as indicated by the scope of the appended claims.

I claim:

1. In combination in a vehicle cover system comprising separate front and rear frames adapted to be attached to the front and rear of a vehicle, respectively, and a cover adapted to be carried by said frames and to cover said vehicle, wherein the improvement comprises said frames being longitudinal in shape and of a length approximating the width of said vehicle and wherein is included means for attaching said front frame to a single support point at the front of said vehicle and means for attaching said rear frame to a single support point at the rear of said vehicle, wherein the vehicle has front and rear license plate mounting means, and wherein said single support points are disposed on said license plate mounting means.

2. The vehicle cover system recited in claim 1, wherein at least one of said front and rear frame members is adapted to be locked by locking means to its respective single point of support, said locking means comprising a slotted nut disposed on said license plate mounting means, said slotted nut providing said single point of support wherein is disposed on said frame member, a lock cylinder having a shank and pin for engaging said slotted nut.

* * * * *